US008271268B2

(12) United States Patent
Keohane et al.

(10) Patent No.: US 8,271,268 B2
(45) Date of Patent: Sep. 18, 2012

(54) METHOD TO TRANSLATE, CACHE AND TRANSMIT TEXT-BASED INFORMATION CONTAINED IN AN AUDIO SIGNAL

(75) Inventors: Susann M. Keohane, Austin, TX (US);
Gerald F. McBrearty, Austin, TX (US);
Shawn P. Mullen, Buda, TX (US);
Jessica C. Murillo, Round Rock, TX (US); Johnny Meng-Han Shieh, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 1079 days.

(21) Appl. No.: 11/736,718

(22) Filed: Apr. 18, 2007

(65) Prior Publication Data

US 2008/0262845 A1 Oct. 23, 2008

(51) Int. Cl.
*G10L 15/00* (2006.01)
*G10L 21/00* (2006.01)
*G10L 19/00* (2006.01)

(52) U.S. Cl. ..... 704/201; 455/130; 704/231; 704/270.1; 713/171

(58) Field of Classification Search .................. 455/130; 704/201, 231, 270.1; 713/171
See application file for complete search history.

(56) References Cited

U.S. PATENT DOCUMENTS

| 5,768,603 | A | 6/1998 | Brown et al. | |
| 6,567,509 | B1 | 5/2003 | Gusler et al. | |
| 6,934,756 | B2 | 8/2005 | Maes | |
| 7,275,159 | B2* | 9/2007 | Hull et al. | 713/171 |
| 2002/0173283 | A1* | 11/2002 | Morewitz et al. | 455/130 |
| 2003/0149557 | A1 | 8/2003 | Cox et al. | |
| 2005/0251394 | A1* | 11/2005 | Carro | 704/270.1 |

FOREIGN PATENT DOCUMENTS

WO WO0175661 A2 10/2001

OTHER PUBLICATIONS

Woodruff, A. et al.; "How Push-To-Talk Makes Talk Less Pushy"; Palo Alto Research Center, Palo Alto, CA; Nov. 2003; ACM 1-58113-693-5/03/0011.
Barbeau, M.; WIMAX/802.16 Threat Analysis; School of Computer Science, Ottawa, Ontario, Canada; Oct. 2005; ACM 1-59593-241-0/05/0010.
Savvides, A et al.; "Dynamic Fine-Grained Localization in AD-HOC Networks of Sensors"; Dept. of Electrical Engineering, UCLA; 2001; ACM ISBN 1-58113-422-3/01/07.

* cited by examiner

*Primary Examiner* — Justin Rider
(74) *Attorney, Agent, or Firm* — Wolf, Greenfield & Sacks, P.C.

(57) ABSTRACT

A method, system and computer-readable medium for generating, caching and transmitting textual equivalents of information contained in an audio signal are presented. The method includes generating a textual equivalent of at least a portion of a speech-based audio signal in one device into a textual equivalent, storing a portion of the textual equivalent in first device's memory and transmitting the stored textual equivalent to a another device.

38 Claims, 4 Drawing Sheets

METHOD TO TRANSLATE, CACHE AND TRANSMIT TEXT-BASED INFORMATION CONTAINED IN AN AUDIO SIGNAL

BACKGROUND OF THE INVENTION

1. Field of the Invention

The present invention relates in general to the field of speech recognition and similar technologies, and in particular to software and devices that perform speech recognition functions.

2. Description of the Related Art

Today, people have access to an increasing array of sources of information. People listen to radio broadcasts in their automobiles as they commute to work. People watch television programs delivered in a number of different broadcasting formats. In much the same manner, people watch and listen to streaming audio and video content on a portable communications device such as a mobile phone. An emerging technology for information distribution that is gaining popularity is so-called "pod-casting", wherein an audio or video program is downloaded to a portable electronic device and played back at the user's convenience.

These various methods of distributing information have at least one thing in common. Information is conveyed to the listener or viewer, in part, by way of an audio signal that is comprised primarily of spoken words. There are occasions when the listener or viewer wants to preserve a portion of the information in the audio signal for later reference but is unable to do so at that time. For example, a person may be listening to a radio program while driving to work in an automobile. That person may hear something to which they would like to refer at a later time, such as a website address, but cannot write it down because it would be unsafe to do so.

As more and more information is digested on-the-go with the use of mobile electronic devices, there will be more occasions where a listener will find it inconvenient or impossible to make a permanent record of information (e.g. write down) in an audio signal for later reference. Therefore, there is a need in the art for a method of quickly capturing and preserving speech-based information in an audio signal in one device and transmitting it to another device at a later time for use by the listener.

SUMMARY OF THE INVENTION

To address the problem described above regarding the capturing and preserving of speech-based information in an audio signal, an improved method, system and computer-readable medium are presented. In a preferred embodiment, the method includes capturing a textual equivalent of at least a portion of a speech-based audio signal in one device, storing only a portion of the textual equivalent in a cache memory coupled to that device and then transmitting the stored portion of textual equivalents to a second device. The method can be invoked manually by an action of the user or the method can be invoked automatically. For example, the method can be invoked automatically by the presence in the audio signal of a keyword within a predefined list of keywords. Alternatively, the method is invoked automatically by the presence of a flag which is encoded in the audio signal at the signal's source.

In another embodiment of the present invention, textual equivalents are continuously captured and stored into one memory location (a buffer) and only a selected portion of the continuously captured textual equivalents is stored/copied to a different memory location (a text cache). That selected portion of textual equivalents stored in the different memory location is subsequently transmitted to a second device. The captured textual equivalents can be transmitted wirelessly to a second device. The textual equivalents can be generated by means of speech recognition technology or can be captured from closed captioning signals that are associated with the audio signal.

One embodiment of the present invention includes at least one radio receiver, television receiver, satellite receiver or portable media player. An alternative embodiment does not include any of these, but includes a means for receiving audio signals from these types of devices.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention presents a method, system, and computer-readable medium to capture, cache and transmit textual equivalents of information contained in an audio signal. One embodiment of the invention allows a user to press a button or similar input device to begin capturing textual equivalents from an audio signal from a device, such as a radio. The textual equivalents are preferably stored in a text cache, from which it can be downloaded to another device, such as a laptop computer or handheld device, and reviewed at a later time. The capturing continues either for a set period of time, or until another input from the user is received to stop capturing.

In another embodiment of the present invention, textual equivalents are stored in the text cache automatically when a flag is detected in the received audio signal. The flag can be a keyword that is defined by the user or manufacturer. Or the flag can be encoded in the signal at its source. For example, broadcasters or content providers can flag certain pieces of information in a program that they anticipate may be of interest to the user. This information will be automatically stored in the text cache once it is received. The user can then download the information in the text cache to another device when it is convenient.

Figure 1:
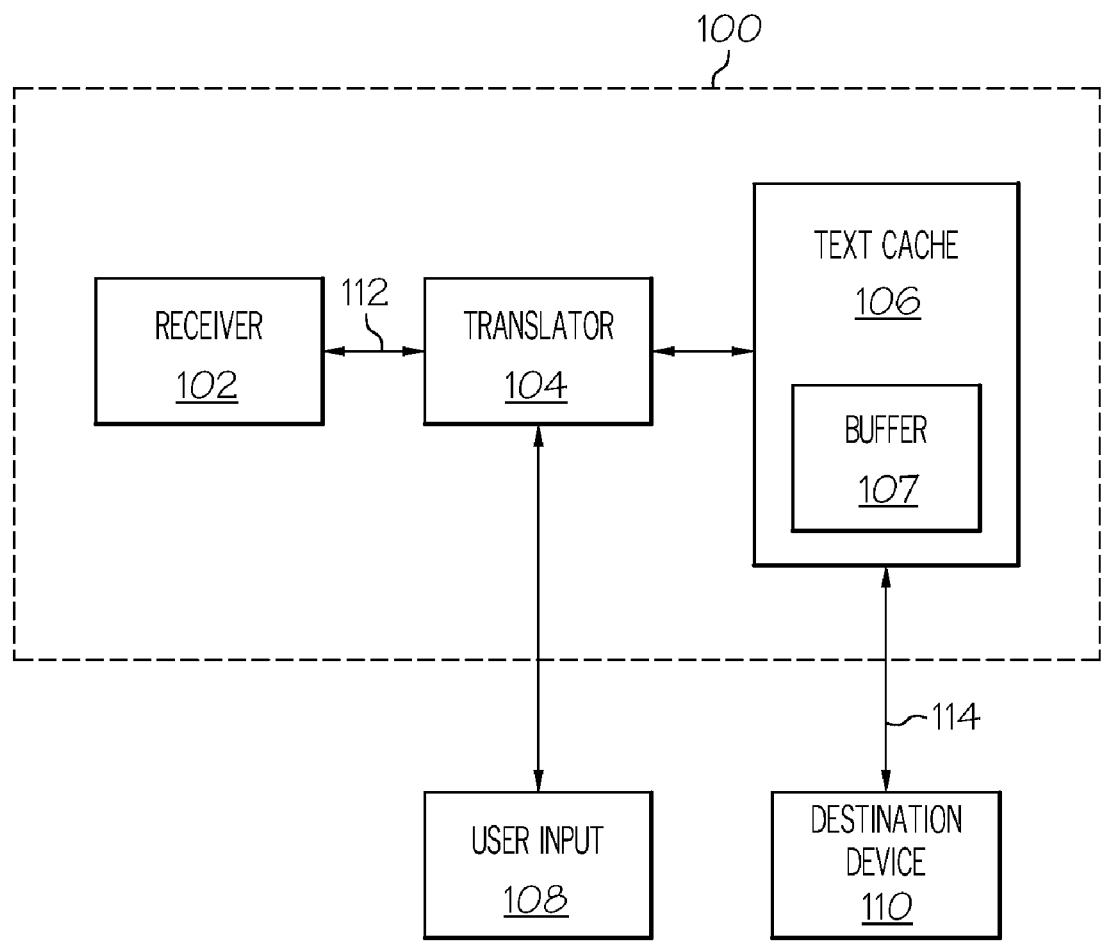
FIG. 1 depicts a high-level block diagram of a text-caching device in accordance with one or more aspects of the present invention.

With reference to the drawings, FIG. 1 depicts a high-level block diagram of a text-caching device in accordance with one or more aspects of the present invention. Text-caching device 100 includes receiver 102, translator 104 and text cache 106. Receiver 102 is one or more of any type of device that receives or otherwise locally generates speech-based audio signals. Examples may include a radio, a television, an automobile radio or a portable media player, such as an MP3 player.

Receiver 102 sends an audio signal to translator 104. Translator 104 includes a means for generating textual equivalents of information contained in audio signals. The textual equivalents include computer-readable text such as ASCII or Unicode. Such speech recognition means are known in the art. If the audio signal has a closed captioning signal associated with it, translator 104 can capture textual equivalents from the closed captioning signal. In one embodiment, translator 104 begins capturing words from audio signal 112 into text upon receipt of a signal from user input 108. Translator 104 captures the textual equivalents from audio signal 112 and stores the text in text cache 106. Translator 104 continues capturing textual equivalents and storing them in text cache 106 for a preset length of time or until receipt of another signal from user input 108. When the user is ready to access the information in text cache 106, destination device 110 is connected to text-caching device 100 via communication link 114. Communication link 114 can be any wired or wireless means of data communication known in the art including, but not limited to, Universal Serial Bus (USB), IEEE 1394, Infrared Data Association (IrDA), IEEE 802.11x (WiFi) or Bluetooth. Once a connection is established, information stored in text cache 106 is then downloaded to destination device 110.

For example, in accordance with one or more aspects of the present invention, text-caching device 100 is a text-caching enabled car stereo with an AM/FM or satellite radio. While the user is driving and listening to a radio program, the user may wish to save a phone number, business name or Internet address that is announced on the program. When the user anticipates a portion of a radio program containing text they would like to cache, the user presses a button to initiate text-caching. The text caching continues for a period of time predefined by the user or until the user presses the button again. Alternatively, the number of times the user presses the button increments the time period for text-caching by a given amount, enabling the user to quickly set the duration of text-caching. When the user arrives at his destination, the user can press another button to wirelessly send the cached text to a mobile phone or personal digital assistant before exiting the vehicle.

In another example, text-caching device 100 is a text-caching enabled portable media player. A user listens to podcasts downloaded to the portable media player while commuting to work on a train or subway. In this environment, it may be difficult to make hand-written notes. With a text-caching enabled portable media player the user only needs to press a button on the device to capture text from the speech-based audio of the podcast. When the user arrives at his destination, the user synchronizes the portable media player with his personal computer and the cached text can be downloaded to the personal computer.

In another example, text-caching device 100 is a text-caching enabled television. User input 108 originates from the remote control of the television. This enables the user to capture text from speech in a television program by pressing a button on the remote. When the user is finished watching television, the user presses another button on the remote to send the cached text to a personal computer on his home network.

In an alternative embodiment, translator 104 continuously captures textual equivalents from audio signal 112 without the need of user input 108 to initiate the capturing process. When translator 104 detects the presence of a flag in the signal, captured text is stored in text cache 106. The flag can be a keyword from a list of keywords defined by the user or manufacturer. For example, the user could define "http" or "www" as keywords. When these keywords are present in audio signal 112, the keywords and the captured text that follow are stored in text cache 106. The flag can also be encoded in the signal at its source. For example a broadcaster or content provider can flag certain pieces of information that they anticipate may be of interest to the user.

In another alternative embodiment, the captured text is stored in buffer 107. When a signal to commence text-caching is received, text stored in buffer 107 is copied to text cache 106. Depending upon the size of buffer 107, text that was captured for a certain period of time prior to receipt of the signal to commence text-caching is available to be stored in text cache 106. This is particularly useful in the case where the user manually invokes text-caching, for example by pressing a button. The situation may arise when the user hears information that they want to cache, but it is too late to press the button in time to cache it. By storing all recently captured text in buffer 107, a predefined amount of text translated prior to the instant when the user presses the button can be stored in text cache 106. For example, when the button is pressed, text stored in buffer 107 ten seconds before and twenty seconds after the button was pressed is copied to text-cache 106. This obviates the need for the user to anticipate when to press the button in advance and reduces the likelihood that desired text goes uncached.

In one embodiment, receiver 102 is included in text-caching device 100 as shown in FIG. 1. This embodiment would be an example of an integrated device, such as a car stereo with built-in text-caching capabilities. In an alternative embodiment, receiver 102 is external to text-caching device 100. Text-caching device 100 would then function as an add-on device to an existing receiver, allowing for backwards compatibility. This enables a lower cost solution for adding the functionality of the present invention to existing electronic equipment without the need to replace such equipment to obtain this functionality. In this embodiment, receiver 102 is connected to text-caching device 100 by any well-known means of wired or wireless transmission, such as line level inputs, digital audio inputs, Universal Serial Bus (USB), IEEE 1394, Bluetooth, or low-power RF modulators.

Figure 2:
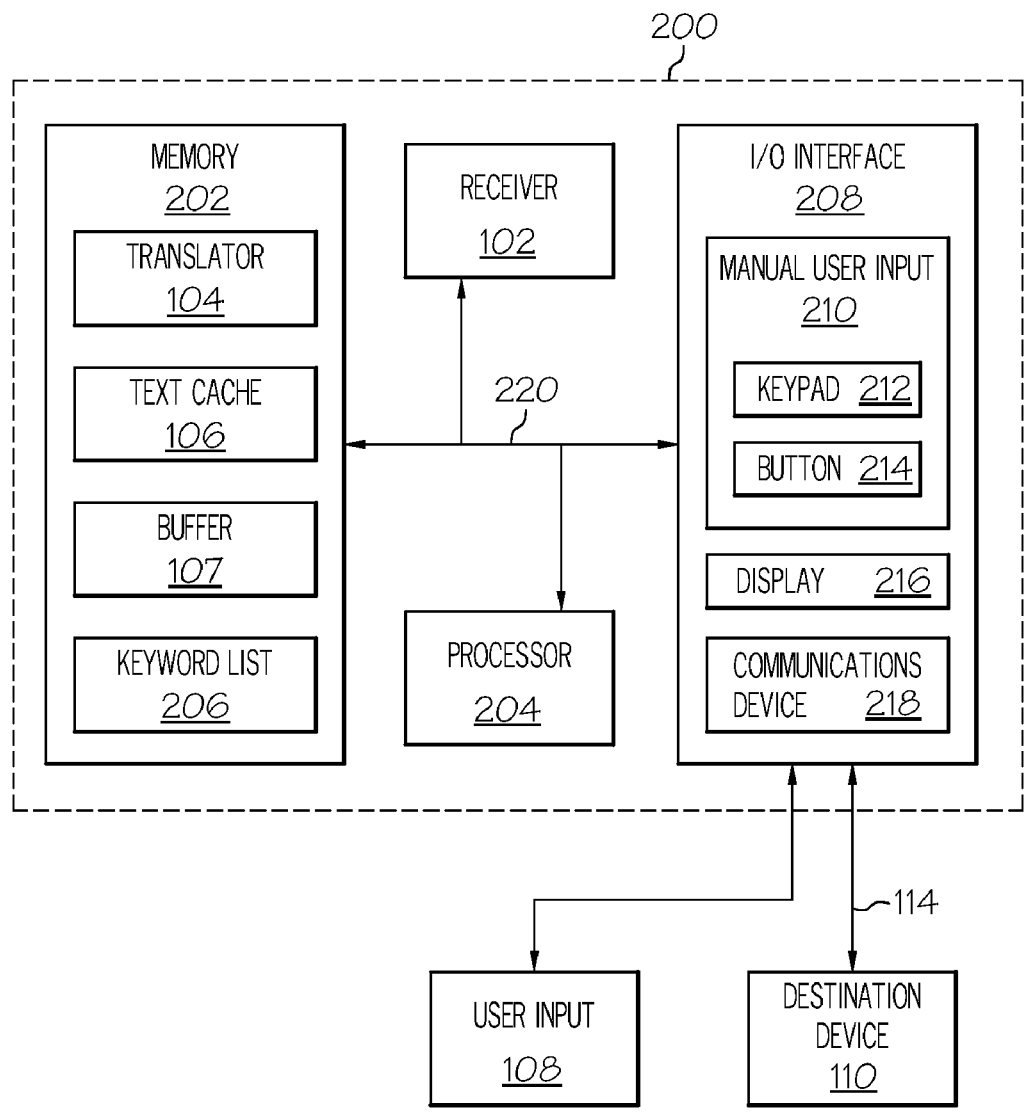
FIG. 2 depicts an exemplary hardware implementation in accordance with one or more aspects of the present invention.

With reference now to FIG. 2, an exemplary minimal hardware implementation in accordance with one or more aspects of the present invention is shown. Text-caching device 200 includes receiver 102, processor 104, memory 202, and input/output (I/O) interface 208. Data is transferred between them via system bus 220. An analog-to-digital converter (ADC) may be disposed between receiver 102 and system bus 220 if needed to convert an analog signal from receiver 102 to a digital signal.

Memory 202 is a computer-readable medium that includes translator 104, text cache 106, buffer 107 and keyword list 206. Translator 104 is a computer program that when executed by processor 204 performs the operations required for translating audio signal 112 into text. The translated text is then stored in text cache 106. In embodiments where continuous text translation is performed, translated text is initially stored in buffer 107 and then text selected for caching is copied from buffer 107 to text cache 106. Keyword list 206 is stored in memory 202 for embodiments that use keywords to invoke text caching.

I/O interface 208 is a means by which the user exchanges data with or issues commands to text-caching device 200. I/O interface 208 includes manual user input 210, display 216 and communications device 218. Manual user input 210 receives user input 108 for the purpose of controlling text-caching device 200. Manual user input 210 may include one or more buttons 214 with which the user can manually invoke text-caching. Manual user input 210 may also include a keypad 212 with which the user can enter keywords into keyword list 206. Display 216 is used to provide visual feedback to the user. For example, display 216 can echo the characters that the user types on keypad 212 while entering a keyword. Or it may display the duration of the text-caching invoked when the user presses button 214. Display 216 can be one of any type of display devices known in the art including, but not limited to, liquid crystal displays (LCD), light emitting diode (LED) displays or electroluminescent (EL) displays. Communications device 218 is used to establish communications link 114 with destination device 110 for the purpose of transmitting text stored in text cache 106 to destination device 110. Communications device 218 is one or more of any type of wired or wireless means of data communication known in the art including, but not limited to, Universal Serial Bus (USB), IEEE 1394, Infrared Data Association (IrDA), IEEE 802.11x (WiFi) or Bluetooth.

In one embodiment, receiver 102 is included in text-caching device 200 as shown in FIG. 2. This embodiment would be an example of an integrated device, such as a car stereo with built-in text-caching capabilities. In an alternative embodiment, receiver 102 is external to text-caching device 200. Text-caching device 200 would then function as an add-on device to an existing receiver, allowing for backwards compatibility. This enables a lower cost solution for adding the functionality of the present invention to existing electronic equipment without the need to replace such equipment to obtain this functionality. In this embodiment, receiver 102 is connected to text-caching device 200 by any well-known means of wired or wireless transmission, such as line level inputs, digital audio inputs, Universal Serial Bus (USB), IEEE 1394, Bluetooth, or low-power RF modulators.

Figure 3:
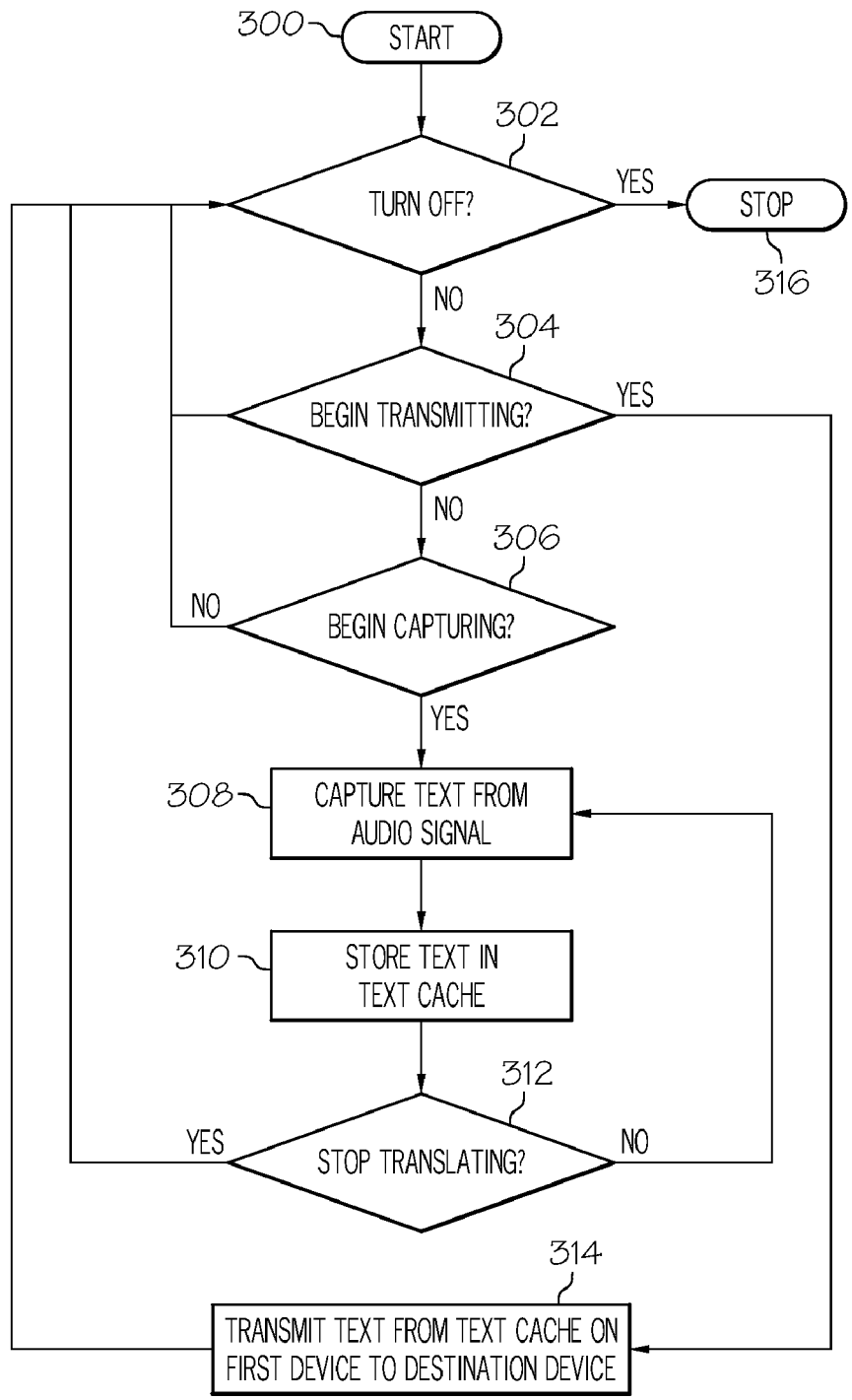
FIG. 3 depicts a high-level flowchart showing the steps of an exemplary process in accordance with one or more aspects of the present invention.

With reference now to FIG. 3, a high-level flowchart showing the steps of an exemplary process in accordance with one or more aspects of the present invention is shown. The process begins at initiator block 300. The process checks to see if the user has requested to end a running process (decision 302). If so, the process ends at terminator block 316. If not, the process checks to see if the user has requested that text in the text cache be transmitted to a second device (decision 304). If so, the text is transmitted to a second device (block 314) and the process returns to decision 302. If not, the process then checks to see if the user has requested to begin capturing textual equivalents from an audio signal (decision 306). If not, the process recursively returns to decision 302. If so, then the process captures textual equivalents (block 308), stores them in the text cache (block 310) and checks to see if the user has requested to end text capturing (decision 312). If the user has not made such a request, the process returns to block 308 and the capturing continues. If the user has made such a request, then the process returns to decision 302.

The invention can take the form of an entirely hardware embodiment, an entirely software embodiment or an embodiment containing both hardware and software elements. In an entirely software embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 4:
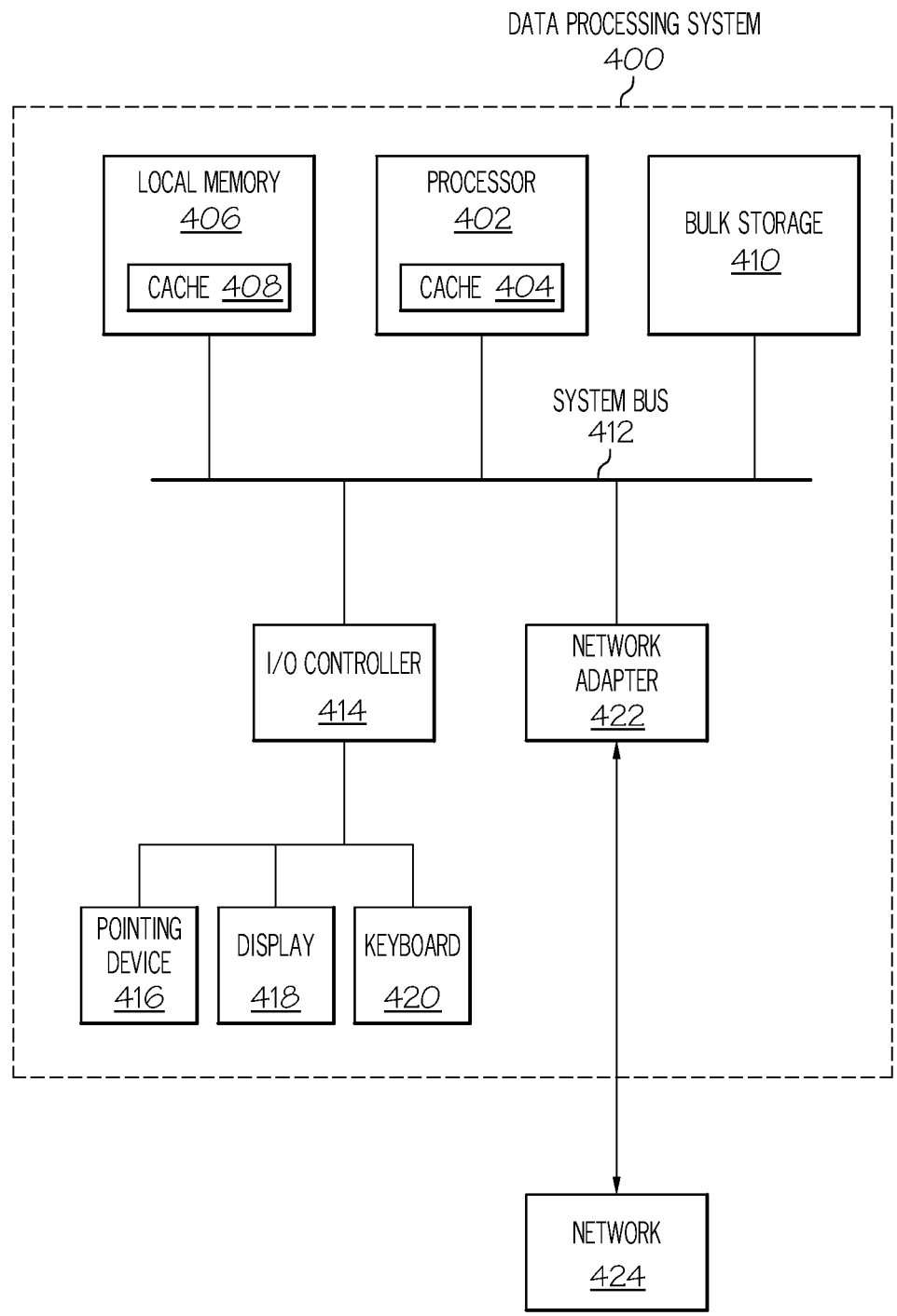
FIG. 4 depicts a block diagram of a data processing system suitable for storing and/or executing a computer program product.

With reference now to FIG. 4, a block diagram of data processing system 400 suitable for storing and/or executing a computer program product is shown. Data processing system 400 includes at least one processor 402 coupled directly or indirectly to memory elements through system bus 412. The memory elements can include local memory 406 employed during the actual execution of the program code, bulk storage 410, and cache memories 404 and 408 which provide temporary storage of at least some program code in order to reduce the number of times code must be retrieved from bulk storage 410 during execution.

Input/output or I/O devices (including but not limited to keyboards 420, displays 418, pointing devices 416, etc.) can be coupled to the system either directly or through intervening I/O controllers 414.

Network adapters 422 may also be coupled to data processing system 400 to enable the system to become coupled to other data processing systems or remote printers or storage devices through intervening private or public networks 424. Modems, cable modems and Ethernet cards are just a few of the currently available types of network adapters.

The present invention thus presents a method, system, and computer-readable medium to translate, cache and transmit text-based information contained in an audio signal. According to the present invention, at least a portion of a speech-based audio signal in a first device is translated into text, the text is stored in a memory of said first device and then the text is transmitted to a second device.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. The term "radio" includes any radio receiving device including, but not limited to, analog AM or FM radios, high definition radios, satellite radios, ham radios, and radio scanners. The term "television" includes any device that generates audio from television signals including, but not limited to, over-the-air tuners, digital television receivers, high definition television (HDTV) receivers, analog satellite receivers, digital broadcast satellite receivers (DBS), digital or analog cable television (CATV) receivers, digital video recorders (DVR), digital versatile disc (DVD) players or video cassette recorders (VCR). The term "portable media player" includes and portable electronic device that plays back recorded media including, but not limited to, mp3 players, iPods, compact disc (CD) players and cassette players.

What is claimed is:

1. A method comprising:
obtaining an audio signal;
capturing a textual equivalent of at least a portion of the audio signal in a first device by processing the at least a portion of the audio signal to capture the textual equivalent from the at least a portion of the audio signal;
in response to capturing the textual equivalent, storing at least a portion of said textual equivalent in a memory accessible by the first device; and
transmitting said at least a portion of said textual equivalent from the first device to a second device.

2. The method of claim 1, wherein the capturing said textual equivalent of said at least a portion of said audio signal in said first device is invoked manually by an action of a user.

3. The method of claim 1, wherein the capturing said textual equivalent of said at least a portion of said audio signal in said first device is invoked automatically.

4. The method of claim 3, wherein the capturing said textual equivalent of said at least a portion of said audio signal in said first device is invoked automatically based on detecting in said audio signal at least one keyword included in a predefined list of keywords.

5. The method of claim 3, wherein the capturing said textual equivalent of said at least a portion of said audio signal in said first device is invoked automatically upon receiving a flag which is encoded in said audio signal at the source of said audio signal.

6. The method of claim 1, wherein the storing said at least a portion of said textual equivalent in said memory further comprises:
continuously storing said textual equivalent to a first memory location; and
selectively storing said at least a portion of said textual equivalent to a second memory location.

7. The method of claim 6, wherein the transmitting said at least a portion of said textual equivalent to said second device further comprises transmitting to said second device said at least a portion of said textual equivalent selectively stored to said second memory location.

8. The method of claim 1, wherein the transmitting said at least a portion of said textual equivalent to said second device further comprises wirelessly transmitting said at least a portion of said textual equivalent to said second device.

9. The method of claim 1, wherein the capturing said textual equivalent of said at least a portion of said audio signal in said first device further comprises generating said textual equivalent from said audio signal using speech recognition.

10. The method of claim 1, wherein the capturing said textual equivalent of said at least a portion of said audio signal in said first device further comprises capturing said textual equivalent from a closed captioning signal associated with said audio signal.

11. The method of claim 1, wherein said first device includes a radio receiver.

12. The method of claim 1, wherein said first device includes a television receiver.

13. The method of claim 1, wherein said first device includes said memory.

14. A system comprising:
a combination of hardware and software elements configured to:
obtain an audio signal;
capture a textual equivalent of at least a portion of the audio signal in a first device by processing the at least a portion of the audio signal to capture the textual equivalent from the at least a portion of the audio signal;
in response to capturing the textual equivalent, store at least a portion of said textual equivalent in a memory accessible by the first device; and
transmit said at least a portion of said textual equivalent from the first device to a second device.

15. The system of claim 14, wherein the combination of hardware and software elements is configured to be invoked manually by an action of a user to capture said textual equivalent of said at least a portion of said audio signal in said first device.

16. The system of claim 14, wherein the combination of hardware and software elements is configured to be invoked automatically to capture said textual equivalent of said at least a portion of said audio signal in said first device.

17. The system of claim 16, wherein the combination of hardware and software elements is configured to be invoked automatically to capture said textual equivalent of said at least a portion of said audio signal in said first device based on detecting in said audio signal at least one keyword included in a predefined list of keywords.

18. The system of claim 16, wherein the combination of hardware and software elements is configured to be invoked automatically to capture said textual equivalent of said at least a portion of said audio signal in said first device upon receiving a flag encoded in said audio signal at the source of said audio signal.

19. The system of claim 14, wherein the combination of hardware and software elements is configured to store said at least a portion of said textual equivalent in said memory at least by:
continuously storing said textual equivalent to a first memory location; and
selectively storing said at least a portion of said textual equivalent to a second memory location.

20. The system of claim 19, wherein the combination of hardware and software elements is configured to transmit said at least a portion of said textual equivalent to said second device at least by transmitting to said second device said at least a portion of said textual equivalent selectively stored to said second memory location.

21. The system of claim 14, wherein the combination of hardware and software elements is configured to transmit said at least a portion of said textual equivalent to said second device at least by wirelessly transmitting said text to said second device.

22. The system of claim 14, wherein the combination of hardware and software elements is configured to capture said textual equivalent of said at least a portion of said audio signal in said first device at least by generating said textual equivalent from said audio signal using speech recognition.

23. The system of claim 14, wherein the combination of hardware and software elements is configured to capture said textual equivalent of said at least a portion of said audio signal in said first device at least by capturing said textual equivalent from a closed captioning signal associated with said audio signal.

24. The system of claim 14, wherein said first device includes a radio receiver.

25. The system of claim 14, wherein said first device includes a television receiver.

26. The system of claim 14, wherein said first device includes said memory.

27. A computer-readable medium encoded with a computer program that when executed by a computer, cause the computer to perform a method comprising:
obtaining an audio signal;

capturing a textual equivalent of at least a portion of the audio signal in a first device by processing the at least a portion of the audio signal to capture the textual equivalent from the at least a portion of the audio signal;

in response to capturing the textual equivalent, storing at least a portion of said textual equivalent in a memory accessible by the first device; and transmitting said at least a portion of said textual equivalent from the first device to a second device.

28. The computer-readable medium of claim 27, wherein the capturing said textual equivalent of said at least a portion of said audio signal in said first device is invoked manually by an action of a user.

29. The computer-readable medium of claim 27, wherein the capturing said textual equivalent of said at least a portion of said audio signal in said first device is invoked automatically.

30. The computer-readable medium of claim 29, wherein the capturing said textual equivalent of said at least a portion of said audio signal in said first device is invoked automatically based on detecting in said audio signal at least one keyword included in a predefined list of keywords.

31. The computer-readable medium of claim 29, wherein the capturing said textual equivalent of said at least a portion of said audio signal in said first device is invoked automatically upon receiving a flag encoded in said audio signal at the source of said audio signal.

32. The computer-readable medium of claim 27, wherein the storing said at least a portion of said textual equivalent in said memory further comprises:

continuously storing said textual equivalent to a first memory location; and selectively storing said at least a portion of said textual equivalent to a second memory location.

33. The computer-readable medium of claim 32, wherein the transmitting said at least a portion of said textual equivalent to said second device further comprises transmitting to said second device said at least a portion of said textual equivalent selectively stored to said second memory location.

34. The computer-readable medium of claim 27, wherein the transmitting said at least a portion of said textual equivalent to said second device further comprises wirelessly transmitting said at least a portion of said textual equivalent to said second device.

35. The computer-readable medium of claim 27, wherein the capturing said textual equivalent of said at least a portion of said audio signal in said first device further comprises generating said textual equivalent from said audio signal using speech recognition.

36. The computer-readable medium of claim 27, wherein the capturing said textual equivalent of said at least a portion of said audio signal in said first device further comprises capturing said textual equivalent from a closed captioning signal associated with said audio signal.

37. The computer-readable medium of claim 27, wherein said first device includes a radio receiver.

38. The computer-readable medium of claim 27, wherein said first device includes said memory.

* * * * *